(12) United States Patent
Cohen et al.

(10) Patent No.: US 11,604,862 B2
(45) Date of Patent: Mar. 14, 2023

(54) BIOMETRIC USER AUTHENTICATION

(71) Applicant: International Business Machines Corporation, Armonk, NY (US)

(72) Inventors: Guy M. Cohen, Ossining, NY (US); Lior Horesh, North Salem, NY (US); Raya Horesh, North Salem, NY (US); David James Frank, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 16/996,137

(22) Filed: Aug. 18, 2020

(65) Prior Publication Data

US 2022/0058248 A1 Feb. 24, 2022

(51) Int. Cl.
*G06F 21/32* (2013.01)
*G06F 16/23* (2019.01)
*G06V 40/10* (2022.01)

(52) U.S. Cl.
CPC .............. *G06F 21/32* (2013.01); *G06F 16/23* (2019.01); *G06V 40/11* (2022.01)

(58) Field of Classification Search
CPC ......... G06F 21/32; G06F 16/23; G06V 40/11; G06V 40/53
See application file for complete search history.

(56) References Cited

U.S. PATENT DOCUMENTS

2012/0218074 A1 8/2012 Luckhardt
2016/0048669 A1 2/2016 Kim
(Continued)

FOREIGN PATENT DOCUMENTS

| CN | 104866746 B | 12/2017 |
|---|---|---|
| CN | 108039949 A | 5/2018 |

(Continued)

OTHER PUBLICATIONS

Devi et al., "Study of Nail Unit Using Image Processing Methods", 2015 International Conference on Computer Communication and Informatics (ICCCI-2015), Jan. 8-10, 2015, Coinbatore, India, 5 pages.

(Continued)

*Primary Examiner* — Alexander Eisen
*Assistant Examiner* — Kebede T Teshome
(74) *Attorney, Agent, or Firm* — Stephanie L. Carusillo (57) ABSTRACT

Embodiments herein disclose computer-implemented methods, computer program products and computer systems for authenticating a user. The computer-implemented method may include receiving biographical data corresponding to a user. A change rate may be determined based on user biographical data. The computer-implemented method may include receiving first biometric data having a time-varying characteristic from the user at a first time and receiving second biometric data having the time-varying characteristic from the user at a second time that is later in time than the first time. Further, the computer-implemented method may include determining third biometric data based at least on the first biometric data, the second time, and the time-varying characteristic, and authenticating the user if the third biometric data is within a predetermined threshold of the second biometric data at the second time.

20 Claims, 6 Drawing Sheets

(56) References Cited

U.S. PATENT DOCUMENTS

2017/0063850 A1* 3/2017 Cartaya ............... H04L 63/0861
2019/0014109 A1   1/2019 Cartaya
2019/0372969 A1   12/2019 Chang

FOREIGN PATENT DOCUMENTS

| CN | 108433724 A   | 8/2018  |
|----|---------------|---------|
| CN | 108574701 A   | 9/2018  |
| CN | 104298909 B   | 11/2018 |
| JP | 2006263348 A  | 10/2006 |
| WO | 2015175670 A1 | 11/2015 |

OTHER PUBLICATIONS

George, Adekunle, O., "Finger nail plate shape and size for personal identification—a possible low technology method for the developing world—Preliminary report", African Journal of Health Sciences, vol. 12, No. 1-2, Jan.-Jun. 2005, 8 pages.

Lee et al., "Fingernail analysis management system using microscopy sensor and blockchain technology", International Journal of Distributed Sensor Networks, 2018, vol. 14(3), © The Author(s) 2018, DOI: 10.1177/1550147718767044, 13 pages.

Parmar et al., "Forensic Onychology: An Essential Entity against Crime", J Indian Acad Forensic Med. Oct.-Dec. 2012, vol. 34, No. 4, ISSN 0971-0973, 3 pages.

Raja et al., "Investigation on Finger Nail Plates Authentication", International Journal of Applied Engineering Research, ISSN 0973-4562 Vol. 9 No. 21,2014, © Research India Publications <http://www.ripublication.com/ijaer.htm,> 7 pages.

* cited by examiner

BIOMETRIC USER AUTHENTICATION

BACKGROUND

The present invention relates generally to the field of user authentication, and more particularly to biometric user authentication.

User authentication methods date back to in-person secret password or secret handshake exchanges to access a secured room, event or facility. A gatekeeper would only grant access to an entrant upon receiving the correct password in the correct manner. In other cases the gatekeeper happens to know the person seeking access. In the absence of a gatekeeper, a person may gain access by using a physical key to unlock a door to the entrance of the secured room, event, or facility. With the ever-evolving development of technology, electronic methods are now used to supplement and/or replace person-to-person and physical key methods described above. For example, instead of a gatekeeper, a secured facility may employ an electronic scanning device to analyze or perform some interaction with the entrant to determine if the entrant is authorized to access the secured facility. On the other hand, instead of a physical key, a secured facility or room may employ an electronic keypad to accept a key code to permit access. Other methods of authenticating a user to access some secured facility have various methodologies that have respective pros and cons.

SUMMARY

The present invention is described in various embodiments disclosing methods, computer program products, and computer systems for authenticating a user. One embodiment of the present disclosure is a computer-implemented method for authenticating a user, the computer-implemented method includes receiving first biometric data from a user at a first time, wherein the first biometric data may include a time-varying characteristic; receiving second biometric data from the user at a second time that is later in time than the first time, wherein the second biometric data may include the time-varying characteristic; determining third biometric data based at least on the first biometric data, the second time, and the time-varying characteristic; and authenticating the user if the third biometric data is within a predetermined threshold of the second biometric data. A change rate may be determined, by the one or more processors, based on biographical data.

DETAILED DESCRIPTION

Biometric data is now routinely used for personal identification. For example, fingerprint data or iris scan data is used to enable access to personal devices or as a substitute to a physical key to a workplace or other facilities. Granting access is not limited to a physical space. Authentication is also used to grant access to a computer and to data. For example, to access a secured database an employee may need to be authenticated first. While the use of biometric data is convenient as no physical key or password is needed, it is also problematic if this biometric data falls into the wrong hands. While passwords can be easily replaced if a password file was hacked, biometric data cannot be changed easily. For example, if a hacker gained access to biometric data stored at a computer at a workplace, that same data can be used to gain access at other locations that were secured by that same data, such as a bank account or government records.

The practice of changing an alphanumeric password every three months or so does not apply to biometric data where the fingerprint or the iris scan is likely to last through the lifetime of the individual. Furthermore, the practice of not using the same alphanumeric password for all accounts for an individual does not apply with biometric data.

The present invention addresses the security issues inherent to biometric data. Instead of using permanent biometric features such as fingerprints or iris scan, the present invention uses biometric features that slowly change over time, combined with a predictive algorithm to account for the change. As an example, fingernail images taken with visible light or near infrared (IR) light can be used to authenticate a person's identity. Fingernails grow about 1 cm per 100 days (the growth rate depends at least on the person's age). As a result, the images of fingernails naturally expire in about 100 days or less due to the relatively significant amount of growth over that period of time.

The present invention therefore relies on slowly varying biometric features. A predictive model is used to estimate the change in the biometric features over time. As time progresses, the estimation error increases, eventually rendering the biometric data obsolete.

Embodiments of the present invention provide a computer-implemented method for authenticating a user that includes one or more processors configured for receiving first biometric data from a user at a first time, wherein the first biometric data may include a time-varying characteristic; receiving second biometric data from the user at a second time that is later in time than the first time, wherein the second biometric data may include the time-varying characteristic; determining third biometric data based at least on the first biometric data, the second time, and the time-varying characteristic; and authenticating the user if the third biometric data is within a predetermined threshold of the second biometric data.

Other embodiments may include the one or more processors configured to determine the third biometric data further based on biographical data corresponding to the user, wherein the biographical data may include data corresponding to at least one of age, gender, health history, nutrition, location, hormones, or habits of the user. The first biometric data may include finger image data corresponding to at least one digit of a hand of the user, wherein the one or more processors may be further configured to determine a first length of a first fingernail of the at least one digit of the hand of the user based on the finger image data. The time-varying characteristic may include the first length of the first fingernail. The third biometric data may be determined at least in part by one or more processors configured to apply a change rate to the time-varying characteristic of the first biometric data at the second time. The change rate may be a numerical factor determined based one or more values corresponding to the biographical data. The change rate may be a rate in which a biometric feature grows (i.e., growth rate), shrinks (i.e., shrink rate), progresses (i.e., progression rate), changes (i.e., change rate) or modified in any way over time. In another embodiment, the first biometric data may include finger image data corresponding to two or more digits of a hand of the user. In another embodiment, the time-varying characteristic may include fingernail characteristics corresponding to nail plate features and nail markings.

Another embodiment of the present invention provide a computer-implemented method for authenticating a user that includes one or more processors configured to receive first biographical data corresponding to a user; determine a change rate based on the first biographical data; receive first biometric data associated with the user from a device at a first time, the first biometric data comprising a time-varying characteristic; determine second biometric data based at least on the first biometric data, the time-varying characteristic, and the change rate; store the second biometric data in a database; receive third biometric data associated with the user at a second time, the third biometric data including the time-varying characteristic; and authenticate the user if the third biometric data is within a predetermined threshold of the second biometric data at the second time. The computer-implemented method may be configured to receive data from a device, a database or a server.

In other embodiments, the first biographical data may include data corresponding to age, gender, health history, nutrition, location, hormones and habits of the user. The first biometric data may include finger image data corresponding to at least one digit of the user's hand. The computer-implemented method may also include determining a first length of a first fingernail of the at least one digit of the user's hand based on the finger image data, wherein the time-varying characteristic comprises the first length of the first fingernail, wherein the second biometric data may be determined at least in part by applying the change rate to the time-varying characteristic at the second time. The first biometric data may include finger image data corresponding to two or more digits of the user's hand. Further, the time-varying characteristic may include two or more lengths of two or more fingernail nail plates of two or more digits of the user's hand. In another embodiment, authenticated biometric data and subsequent authenticated biometric data may be added to the database upon successful authentication and replace old data to improve the confidence of subsequent matching due to the recency of the authenticated biometric data.

In some embodiments, the computer-implemented method may include one or more processors configured to receive first biometric data associated with user 140 from a device at a first time, the first biometric data comprising a time-varying characteristic. Biometric data may include measurable or uniquely distinguishable biometric characteristics (e.g., fingerprint features, iris features, facial features, voice features) represented as numerical values. Biometric data corresponds to user feature data that are unique to user 140 and affixed to user 140's innate characteristics. Biometric data may also include a time-varying characteristic (i.e., characteristic that changes over time). For example, a biometric feature that slowly changes over time is fingernail length, wherein as a result of this particular feature, fingernail length data would naturally expire over time. Another biometric feature that slowly changes over time is fingernail patterns that may slightly rotate, translate, increase in size or even decrease in size. Thus, a time-varying characteristic may include fingernail features because they are biometric features that slowly change over time.

Biometric data may include data corresponding to time-varying characteristics such as a fingernail image, which in turn may include fingernail characteristics or fingernail features (e.g., fingernail length, nail plate length, fingernail markings, nail markings, lines, dots, changes in color, spots, roughness, specular or dull regions), which may be represented as a numerical value in the biographical data. A growth rate for the fingernail length or a fingernail marking may be a length per period of time (e.g., 1 cm per 100 days) and may be determined based on one or more user characteristics (as described above herein) and the time of the year. A change rate may be determined based at least on one or more user characteristics (e.g., age, sex, hormonal level, hormonal frequency) represented in the biographical data. The present invention will now be described in detail with reference to the Figures.

Figure 1:
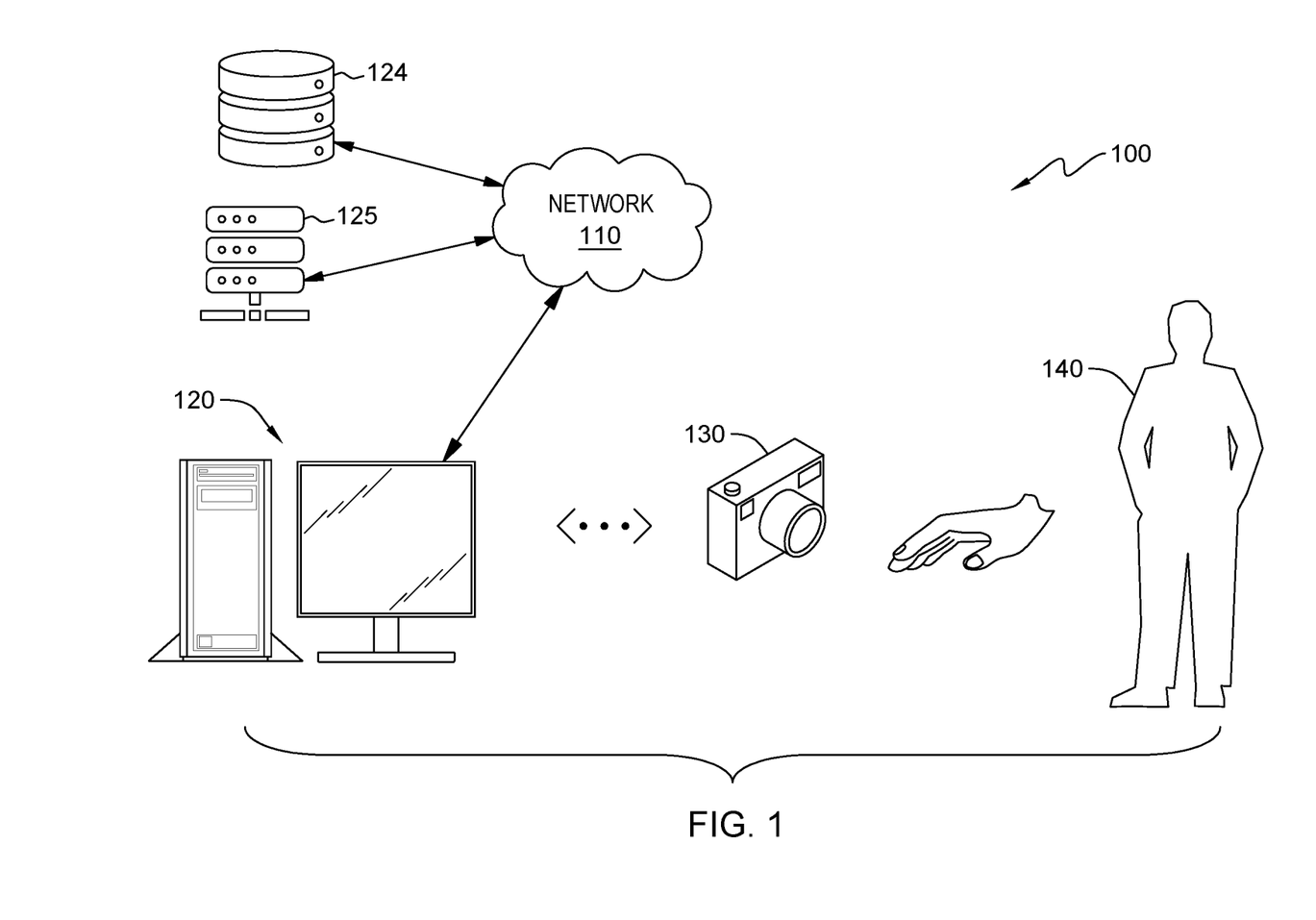
FIG. 1 depicts a block diagram of a distributed network environment for authenticating a user, in accordance with an embodiment of the present invention.

FIG. 1 depicts a block diagram of a distributed network environment 100 for authenticating a user, in accordance with an embodiment of the present invention. FIG. 1 provides only an illustration of one embodiment of the present invention and does not imply any limitations with regard to the environments in which different embodiments may be implemented. Distributed network environment 100 represents a system for biometric based security with natural expiration of the biometric data. In the depicted embodiment, the distributed network environment 100 includes computing device 120 in communication with network 110. Computing device 120 may also be communicatively coupled to an image sensor 130. Image sensor 130 may be a camera configured to capture an image from user 140. Image sensor 130 may be any other device configured to detect biometric properties of an image. Distributed network environment 100 may include database(s) 124 and server(s) 125 in communication with network 110. Distributed network environment 100 may also include additional servers, computers, sensors, or other devices not shown.

Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 120, image sensor 130. It is further understood that in some embodiments network 110 is optional and the authentication system can operate as a stand-alone system, where in other embodiments, network 110 may be configured to enable more than one computing device to share a joint database using network 110.

In an embodiment, computing device 120 may be installed at a secured facility or secured room positioned to receive user interaction via the peripherals of computing device 120. An example of user interaction may include receiving biographical information or user information from user 140. Another example of user interaction may include, while computing device 120 is positioned at a locked door of a secured facility and equipped with image sensor 130 (e.g., a camera), computing device 120 being configured to capture an image of a hand of user 140. Computing device 120 in conjunction with image sensor 130 may also be configured to provide data privileges to user 140 when accessing secure information stored in a computer. These privileges may include read only, write/modify, delete, and copy.

Once user 140 offers a hand within view of the camera lens of image sensor 130, computing device 120 may be configured to detect the hand of user 140 and capture an image of the hand, more particularly focusing on the fingernails of the hand. Image sensor 130 may capture more than one image as well as images taken at different angles of each finger so corrections for images distortions can be applied. The images may be captured with one or more of: visible light, UV light, and infrared light. Multiple wavelengths may be used to capture additional features that are not visible using the common visible light imaging. Computing device 120 may be configured to store images of the hand and perform hand characteristics analysis on the hand to determine if user 140 is authorized to access the secured facility. The analysis may be performed on computing device 120 or via a cloud-based service residing on server(s) 125 and accessible via network 110.

Such analysis may include determining characteristics of the hand as biometric characteristics and storing the biometric characteristics as biometric data corresponding to user 140. The biometric data may be used at a later time to perform user authentication when user 140 returns to access the secured facility again. However, the invention described herein may be configured to evolve the biometric data to account for the period of time that has elapsed since user 140 was last authenticated. To evolve may be defined as to compute or predict how the biometric data would change after a period of time. As biometric features evolve naturally, data corresponding to the biometric features evolves naturally. Embodiments of this invention may be configured to predict the natural evolution of biometric features and represent the predicted evolved biometric features as corresponding biometric data. Therefore, user 140 may only be authenticated if the newly scanned fingernail images match, within a predetermined threshold, the evolved biometric data corresponding to the previously captured fingernail images.

Computing device 120 operates to execute at least a part of the computer program for authorizing a user. In an embodiment, computing device 120 may be communicatively coupled with image sensor 130 or image sensor 130 may be a component of computing device 120. Computing device 120 be configured to send and/or receive data from network 110 and image sensor 130. In some embodiments, computing device 120 may be a management server, a web server, or any other electronic device or computing system capable of receiving and sending data. In some embodiments, computing device 120 may be a laptop computer, tablet computer, netbook computer, personal computer (PC), a desktop computer, a smart phone, or any programmable electronic device capable of communicating with database(s) 124, server(s) 125 via network 110. Computing device 120 may include components as described in further detail in FIG. 6.

Computing device 120 may also be configured to receive, store, and process images captured on image sensor 130. For example, computing device 120 may be communicatively coupled to image sensor 130 and receive, via a communications link, data corresponding to images captured by image sensor 130. Computing device 120 may be configured to store the image data in memory of computing device 120 or transmit the image data to database(s) 124 or server(s) 125 via network 110. The image data may be processed by one or more processors of computing device 120 or by one or more processors associated with server(s) 125.

Database 124 operates as a repository for data flowing through network 110. Examples of data include user data, device data, network data, and data corresponding to images captured by image sensor 130. A database is an organized collection of data. Database 124 can be implemented with any type of storage device capable of storing data and configuration files that can be accessed and utilized by computing device 120, such as a database server, a hard disk drive, or a flash memory. In an embodiment, database 124 is accessed by computing device 120 to store data corresponding to images captured by image sensor 130. In another embodiment, database 124 is accessed by computing device 120 to access user data, device data, network data, and data corresponding to images captured by image sensor 130. In another embodiment, database 124 may reside elsewhere within distributed network environment 100 provided database 124 has access to network 110.

Figure 2A:
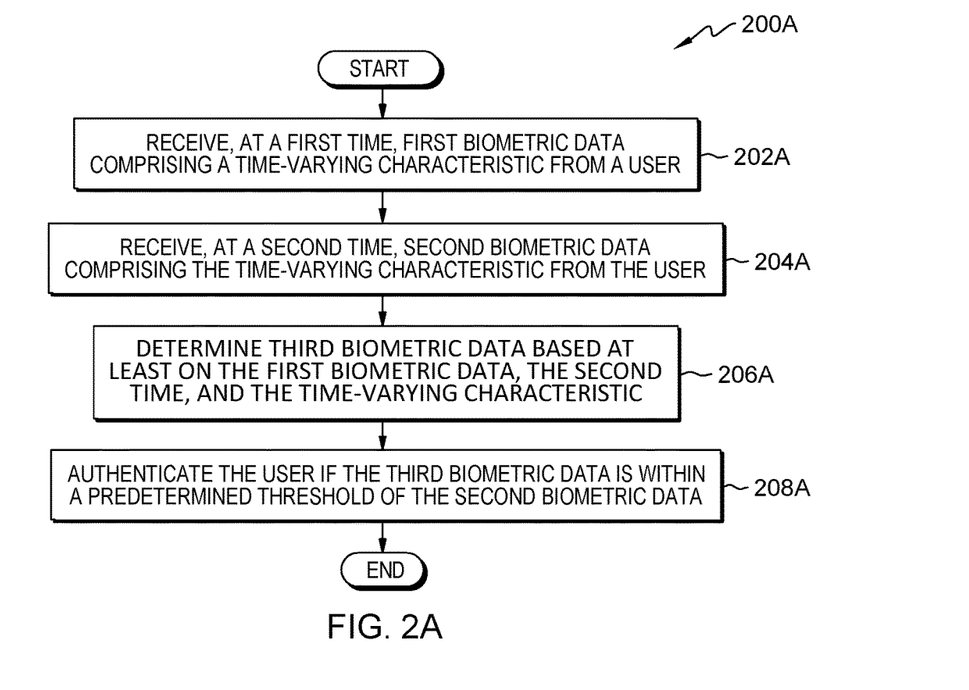
FIG. 2A depicts a flow chart of a method for authenticating a user, in accordance with an embodiment of the present invention.

FIG. 2A depicts a flow chart of a method 200A for authorizing a user, in accordance with an embodiment of the present invention.

In an embodiment, method 200A may include one or more processors configured to receive 202A, at a first time, first biometric data (e.g., first in time user provided biometric data) from user 140, wherein the first biometric data may include a time-varying characteristic. In some embodiments, method 200A may include one or more processors of computing device 120 configured to receive biographical data corresponding to user 140. Biographical data may be received at computing device 120 at a time that is prior to or after the time at which the biometric data is received at computing device 120. Computing device 120 may be configured to receive the biometric data or the biographical data via user input, e.g., user interface, connected to or in communication with computing device 120. Computing device 120 may also be configured to receive the biometric data or the biographical data from database(s) 124 or server(s) 125 via network 110.

Biographical data may include data corresponding to user characteristics, e.g., characteristics of user 140. For example, user characteristics may include a name, age, sex, a unique identification number (e.g., phone number, passcode), unique identification alphanumeric number, and home or work address information. As mentioned above, biometric data may include measurable or uniquely distinguishable biometric characteristics (e.g., fingerprint features, iris features, facial features, voice features) represented as numerical values.

In some embodiments, one or more processors may be configured to determine a change rate based on the biographical data. As mentioned above, the change rate may be a numerical factor determined based one or more values corresponding to the biographical data and other relevant data. The change rate may be a rate in which a biometric feature grows (i.e., growth rate), shrinks (i.e., shrink rate), progresses (i.e., progression rate), changes (i.e., change rate) or modified in any way over time in the future or in the past. For example, biographical data may include data corresponding to user characteristics such as age, gender, sex, health history, nutrition, location, hormones, or habits of user 140. Biographical data may be represented as numerical values in the biographical data.

In an embodiment, method 200A may include one or more processors configured to receive 204A second biometric data (e.g., later in time user provided biometric data) from user 140 at a second time that is later in time than the first time, the second biometric data may include the time-varying characteristic. In this example, second biometric data may originate from the same source as the first biometric data, but at a later time, wherein the source is user 140. For example, computing device 120 may receive first biometric data from user 140 at time t, and second biometric data may be received from user 140 at a time t+1.

In an embodiment, method 200A may include one or more processors configured to determine 206A third biometric data based at least on the first biometric data, the second time, and the time-varying characteristic. In some embodiments, method 200A may include one or more processors configured to determine the third biometric data further based on biographical data corresponding to user 140, wherein the biographical data comprises data corresponding to at least one of age, gender, health history, nutrition, location, hormones, or habits of the user. The third biometric data may also be determined at least in part by applying a change rate to the time-varying characteristic of the first biometric data at the second time, wherein the time-varying characteristic may include fingernail characteristics corresponding to nail plate features and nail markings. Biometric data that is determined by one or more processors is not user provided, rather determined by one or more processors performing a function or process on data received from user 140.

In some embodiments, one or more processors may be configured to determine second biometric data, at a time shortly, or at any time, after receiving user first biometric data (e.g. user provided biometric data). For example, one or more processors may be configured to determine second biometric data based at least on the first biometric data, the time-varying characteristic, and the change rate. Second biometric data may correspond to biometric data that is representative of evolved biometric data (i.e., first biometric data), wherein one or more processors may be configured to evolve or change the first biometric data into a version that would be virtually identical to third biometric data captured from user 140 at a determinable time in the future. The second biometric data may be determined based on the first biometric data and applying the change rate to the time-varying characteristic at the second time.

A predictive model may be used to determine (e.g., estimate, predict, forecast) the biometric feature changes over time. For example, if features in the fingernail image move, translate, or rotate over time, then a predictive model may determine the new position due to the change and generate biometric data corresponding to the new position of the features. Alternatively, if the growth rate is 1 cm per 100 days and the time-varying characteristic is fingernail length, then a predictive model may determine that the fingernail would be 1 cm longer at the $100^{th}$ day after the image was taken. The predictive model may also include an estimation or prediction error which grows over time, eventually rendering the biometric data obsolete. For example, fingernail images would expire within about 100 days from the date they were taken. However, biometric data may be assigned various expiration dates based on the respective time-varying characteristics of each biometric feature or just by design.

Further, one or more processors may be configured to store the second biometric data in a memory or database. In an embodiment, computing device 120 may receive biometric data from user 140 and store the biometric data in a local storage device or memory. Computing device 120 may also be configured to transmit the biometric data or any other data to a remote memory storage device (e.g., database(s) 124) via network 110.

Further, in the example where one or more processors determine second biometric data, one or more processors may be configured to receive third biometric data, including the time-varying characteristic, at a second time that is later in time than the first time. As mentioned above herein, third biometric data may be captured or received from user 140 at computing device 120 via image sensor 130 at a time later (i.e., a second time) than the first time at which the first biometric data was captured at computing device 120. In other words, third biometric data is the same as first biometric data except it was gathered at a later time and the biometric features for user 140 will have aged or evolved due to the time duration for which it takes time-varying biometric features to age. For example, user 140 may provide a hand to have a first image of the hand be captured by image sensor 130 at a first time, and at a second later time, user 140 may provide the same hand to have a second image of the hand be captured by image sensor 130. The second image of the hand would be used to determine third biometric data to be used for further processing, according to embodiments of this invention.

In an embodiment, method 200A may include one or more processors configured to authenticate 208A user 140 if the biometric data that was determined based at least one on user provided biometric data is within a predetermined threshold of the biometric data that was received at a time that is later in time than the user provided biometric data. In other words, method 200A may include one or more processors configured to authenticate 208A user 140 if the third biometric data is within a predetermined threshold of the second biometric data at the second time. For example, if first biometric data is received at a first time, second biometric data is received at a second time, and third biometric data is determined based at least on first biometric data and the second time, then one or more processors may be configured to authenticate user 140 if third biometric data is within a predetermined threshold of second biometric data. Alternatively, method 200A may include one or more processors configured to deny user 140 access to the secured facility or secured computing device 120 if third biometric data is not within a predetermined threshold of the second biometric data.

In some embodiments, one or more processors may be configured to perform an analysis on second biometric data and third biometric data to determine or measure similarities among the same time-varying characteristics, e.g., fingernail length. If the difference between second biometric data and third biometric data are within an acceptable amount, then the one or more processors may be configured to generate an output indicating that user 140 is authorized to access the secured facility or secured data and authenticate user 140 to gain access. If the difference between second biometric data and third biometric data are beyond an acceptable amount of threshold, then the one or more processors may generate an output indicating that user 140 is not authorized to access the secured facility and deny user 140 access.

Figure 2B:
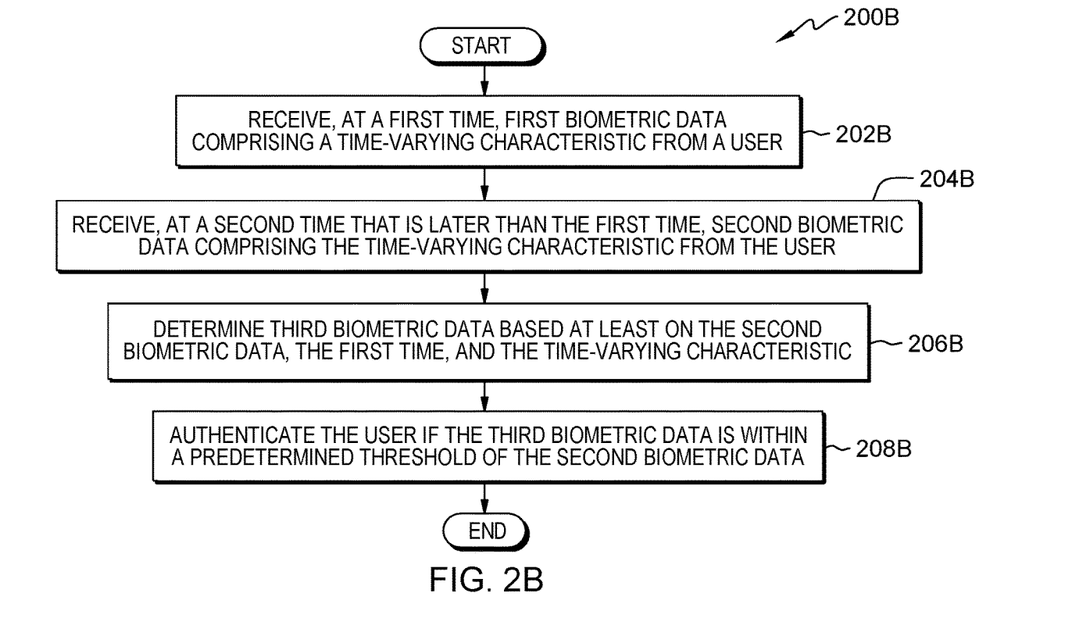
FIG. 2B depicts a flow chart of an alternate method for authenticating a user, in accordance with an embodiment of the present invention.

In an alternative embodiment, method 200B may evolve biometric data to a time prior to the time at which the biometric data was captured. For example as illustrated in FIG. 2B, method 200B may include one or more processors configured to receive 202B first biometric data corresponding to user 140 at a first time, store the first biometric data in a database, associate a time stamp of when the first biometric was captured from user 140 with the first biometric data. Method 200B may further include one or more processors configured to receive 204B second biometric data from user 140 at a second time that is later in time than the first time. Method 200B may determine 206B third biometric data based at least on the second biometric data, the first time, and the time-varying characteristic. In other words, third biometric data may be determined by backwards evolving the second biometric data to the first time when first biometric data was captured to generate third biometric data (e.g., aged biometric data, backward evolved biometric data) that may be virtually identical to first biometric data. Method 200B may also include one or more processors configured to compare the third biometric data to the first biometric data and authenticate 208B user 140 if the comparison is within a predetermined threshold.

Figure 3:
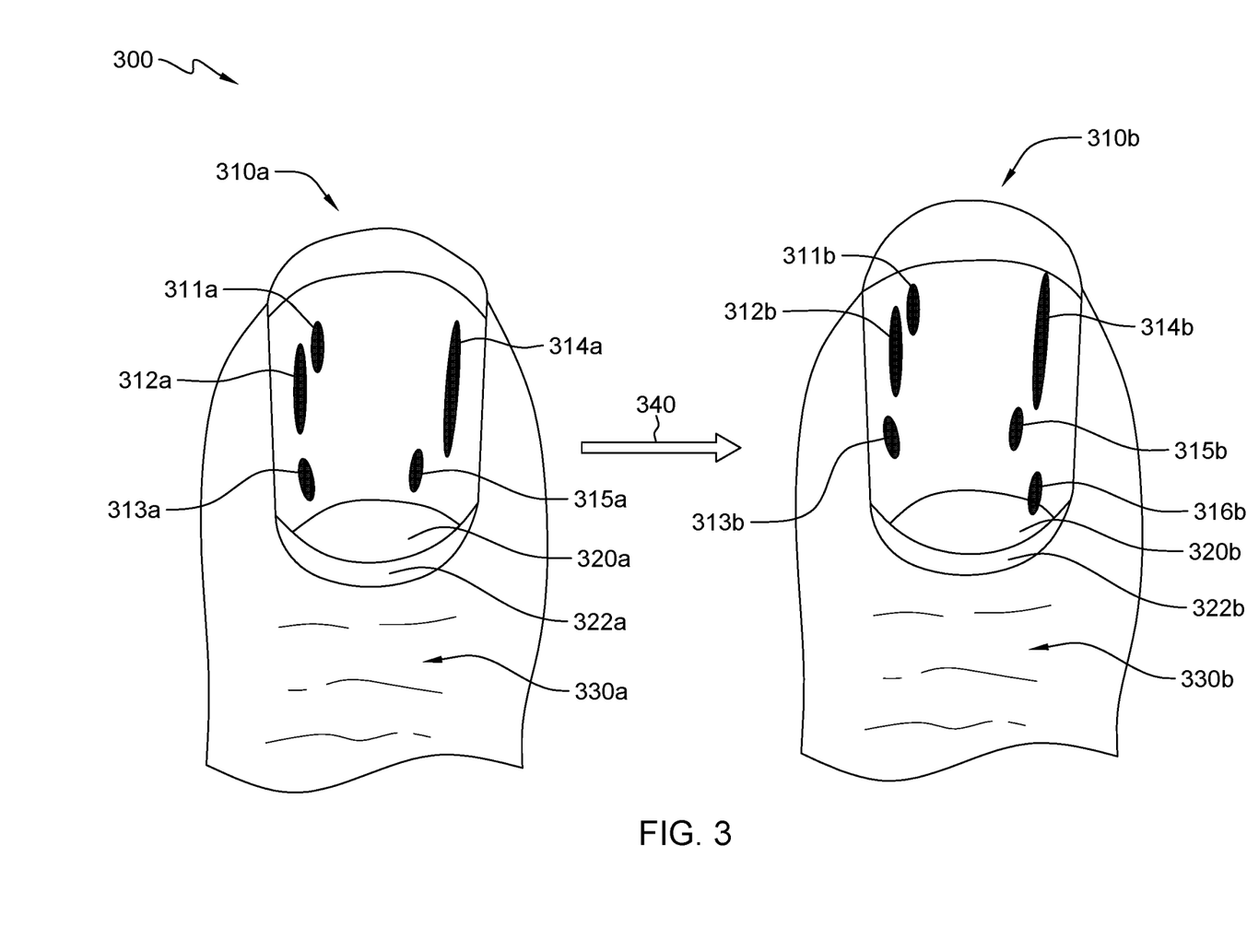
FIG. 3 depicts an evolve chart used for authenticating a user, in accordance with an embodiment of the present invention.

FIG. 3 depicts an evolve chart 300 for authenticating a user, in accordance with an embodiment of the present invention. The left image shows an image of a fingernail taken at a first (early) time, and the right image show an image of the same fingernail captured at a second (later) time. For example, first biometric data may correspond to the left image, while second biometric data may correspond to the right image captured at a present time when user 140 makes an attempt to authenticate at a time after the first time. The fingernail may include features to distinguish one fingernail from another. For example, a fingernail feature may include a nail plate 310a (the upper portion of the nail). The nail plate 310a may be measured from the beginning of the nail at the cuticle 322a to the distal end that grows beyond the nail bed (the skin beneath the nail plate). The nail bed may include one or more nail markings 311a, 312a, 313a, 314a, 315a shown through nail plate 310a that grow in the same direction as nail plate 310a and emerge from the matrix (not labeled) and beyond the cuticle 322a. The cuticle 322a is the tissue that overlaps nail plate 310a as a rim to the base of nail plate 310a. The nail folds (not labeled) are the skin folds that frame and support nail plate 310a on three sides (i.e., left side, bottom side, right side) and lunula 320a is the whitish half-moon at the base of nail plate 310a. The matrix is the hidden part of the nail unit under the cuticle 322a. Skin folds 330a are the skin wrinkles most proximal to nail plate 310 and are unique to each individual. Nail plates 310a grow from the matrix. The average growth rate for nail plate 310a is 0.1 mm each day and the exact rate of nail growth depends on numerous factors including the age and sex of the individual and the time of the year.

In an embodiment, fingernail features shown in the evolve chart 300 may change over time or evolve 340 over a period of time. Fingernail features may lengthen, shorten, rotate, be removed, colored, enlarged, shrunk, or any other types of modifications know to a person of ordinary skill in the art. After the period of time, the fingernail features may be represented by second biometric features indicated by 3XXb numerical identifiers in evolve chart 300. In an embodiment, one or more processors may be configured to evolve nail plate 310a into nail plate 310b, nail markings 311a, 312a, 313a, 314a, 315a into nail markings 311b, 312b, 313b, 314b, 315b based on first biometric data, the time-varying characteristic, and the change rate. As a result of the one or more processors evolving the fingernail features, new nail markings may emerge, thus revealing nail marking 316b. The one or more processors may be configured to evolve lunula 320a into lunula 320b, cuticle 322a into cuticle 322b and skin folds 330a into skin folds 330b. wherein each fingernail feature's evolution may be determined to be a difference from the first time to the second time. The evolved fingernail features indicated by 3XXb numerical identifiers may correspond to second biometric features represented as second biometric data based on first biometric data, the time-varying characteristic, and the change rate.

In an embodiment, one or more processors may be configured to evolve or predict future biometric features (e.g., fingernail features) by estimating the slowly changing biometric features over time combined with a predictive algorithm to account for the change. For example, fingernail images taken with visible light or near infrared light may be used to authenticate a user's identity. A predictive model may be used to estimate change in biometric features over time. As time progresses, the estimation error grows and eventually the biometric data become obsolete.

Figure 4:
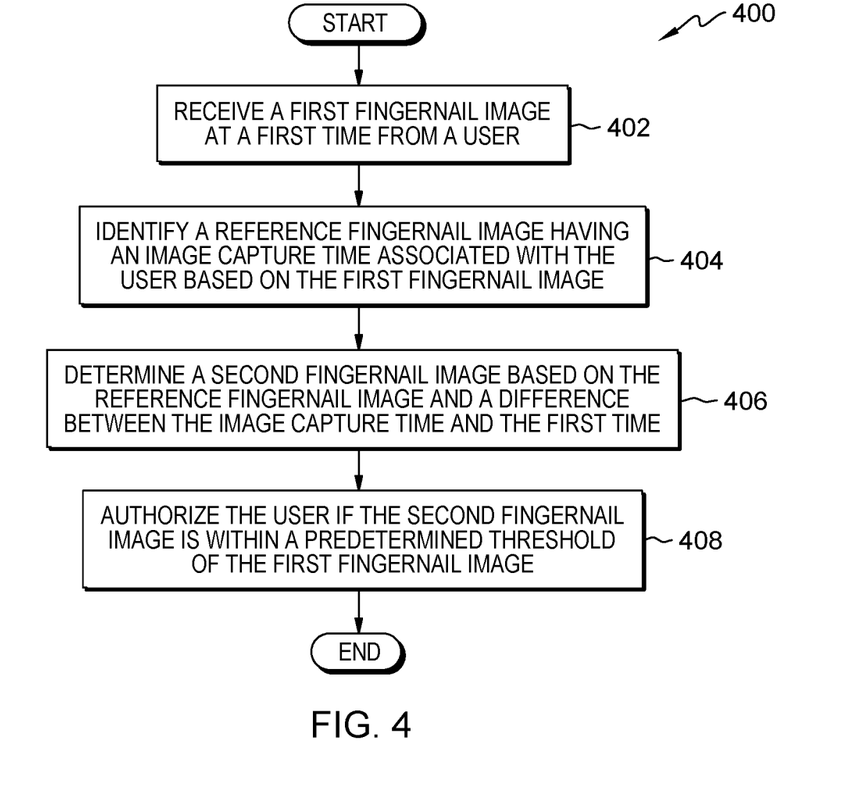
FIG. 4 depicts a flow chart of another method for authenticating a user, in accordance with an embodiment of the present invention.

FIG. 4 depicts a flow chart of another method 400 for authorizing a user, wherein a first (i.e., current) fingernail image may be used to identify a reference (i.e., prior) fingernail image to evolve for comparison to the first fingernail image. In an embodiment, one or more processors may be configured to receive 402 a first fingernail image at a first time from user 140, as described herein. Method 400 may further include one or more processors configured to identify 404 a reference fingernail image, having an image capture time, associated with user 140 based on the first fingernail image. The image capture time may be at a time prior to the first time. The reference fingernail image may be stored in and identified within database(s) 124, as described herein.

In some embodiments, method 400 may include one or more processors configured to retrieve a reference (or "prior") fingernail image corresponding to the first identifier from database(s) 124, the reference fingernail image including a date corresponding to a day and time when the fingernail image was captured. In an embodiment, database(s) 124 may be accessed by one or more processors to retrieve reference fingernail images associated with user 140. The reference fingernail images may be retrieved at a time shortly after user 140 provides biographical data and/or biometric data to computing device 120. The reference fingernail images may be stored in database(s) 124 at any time prior to user 140 providing biographical data or biometric data to computing device. When reference fingernail images are stored, biographical data corresponding to user 140 may be associated with the reference fingernail images, so that when user 140, at a later time, requests authentication at computing device 120, method 400 may be configured to retrieve the reference fingernail images that correspond to user 140 based on the association. Further, when reference fingernail images are stored, a time stamp including a date and time, may be associated with the reference fingernail images. Furthermore, one or more processors may be configured to assign an expiration date to each of the reference fingernail images when stored in database(s) 124, or at some time thereafter. For example, an expiration date may be assigned to a first reference fingernail image such that after 100 days, the first reference fingernail image becomes obsolete after a period of 100 days has expired. Each fingernail image may be assigned an expiration date when stored in database(s) 124.

Method 400 may further include one or more processors configured to determine 406 a second (i.e., evolved) fingernail image based on the reference fingernail image and a difference between the image capture time and the first time.

For example, the second fingernail image may be determined based at least on applying a change factor and the time difference between the image capture time and the first time to fingernail features identified in the reference fingernail image. Once applied, the change factor and time difference will result in an evolution or change to the reference fingernail image such that it will resemble what the reference fingernail image would have appeared to be under natural circumstances if taken at the first time.

In some embodiments, method 400 may include one or more processors configured to determine a second fingernail image based on the reference fingernail image (or "prior fingernail image"), the date, and a change rate. In an embodiment, one or more processors may be configured to determine a second fingernail image based on a reference fingernail image, the date associated with the reference fingernail image and a change rate. For example, one or more processors may be configured to apply the reference fingernail image, the associated date and the change rate to a predictive algorithm to predict biometric features of second fingernail image at a time later than the associated date. In other words, the predictive algorithm may be configured to evolve the reference fingernail image into the second fingernail image at a time or day later than the time stamp associated with the reference fingernail image.

In an embodiment, the predictive algorithm that may be used to evolve a fingernail image is a deep convolutional recurrent neural network (e.g., PredNet) based on the principles of predictive coding from neuroscience. PredNet is trained for next-frame video prediction with the contextual understanding that prediction is an effective objective for unsupervised (i.e., "self-supervised") learning. Other predictive models or algorithms may be used to evolve the reference fingernail image(s) or previous fingernail image(s) into a second fingernail image(s) based on previous fingernail image(s), the change rate and a time including a day and/or a time. Reference fingernail image(s) may also be previous fingernail image(s) so long as the reference fingernail image(s) was captured prior to a second or later fingernail image(s).

Further, method 400 may include one or more processors configured to authorize 408 user 140 if the second fingernail image is within a predetermined threshold of the first fingernail image, as described herein. In an embodiment, one or more processors may be configured to perform analysis on data corresponding to reference fingernail image and second fingernail image to determine the difference between the images. For example, reference fingernail image may be taken at a first time and second fingernail image may have been evolved from reference fingernail image based on a change rate and a time period, wherein the time period is 10 days and the change rate is 100 cm per 100 days. In this example, the one or more processors may be configured to determine that nail plate 310*a* in reference fingernail image would have grown 10 cm over the time period of 10 days to resemble nail plate 310*b* in second fingernail image. Further, the one or more processors may be configured to determine that nail markings 311*a*, 312*a*, 313*a*, 314*a*, 315*a* have evolved over the time period of 10 days into nail markings 311*b*, 312*b*, 313*b*, 314*b*, 315*b*. Thus, if the nail plate length and nail marking positions of second fingernail image are within a predetermined threshold, then user 140 would be authenticated and authorized to access the secured facility. Other analysis may be performed on the compared fingernail image datasets or fingernail features to determine if the newly captured fingernail images are within the metric values necessary for authentication and authorization.

In some embodiments, one or more processors may be configured to determine biometric data based on biographical data, wherein the biometric data may include fingernail image data for authorizing a user. In an embodiment, method 400 may include one or more processors configured to receive first biographical data at a first time from a user. As described above herein, biographical data may include data corresponding to characteristics of user 140 or user characteristics. For example, user characteristics may include a name, a unique identification number (e.g., phone number, passcode), unique identification alphanumeric number, and home or work address information. The method may include one or more processors configured to receive the biographical data via a peripheral device connected to or in communication with computing device 120.

In some embodiments, the method may include one or more processors configured to determine that the first biographical data includes a first identifier and fingernail image data corresponding to one or more fingernail images belonging to the user. In an embodiment, the one or more processors may be configured to process biographical data received via a peripheral device communicatively coupled to computing device 120, wherein the processing includes identifying an identifier that is unique to user 140 to distinguish user 140 from another user. The one or more processors may also be configured to process biometric data received via a peripheral device communicatively coupled to computing device 120, wherein the processing includes identifying a current image of a fingernail corresponding to user 140. In other words, the method may be configured to identify user 140 as a unique user and associate received current fingernail images as those belonging to user 140.

In another embodiment, each evolved fingernail image and each newly captured may be stored in database(s) 124 as new images to be used at a later date to improve the image evolving process. As more fingernail images are uploaded, the predictive algorithm improves with new data showing the changes of progression of fingernail features as time advances. Error corrections may be made to evolved fingernail images and those corrections may be carried over into future evolutions to improve the predictive model/algorithm results.

Figure 5:
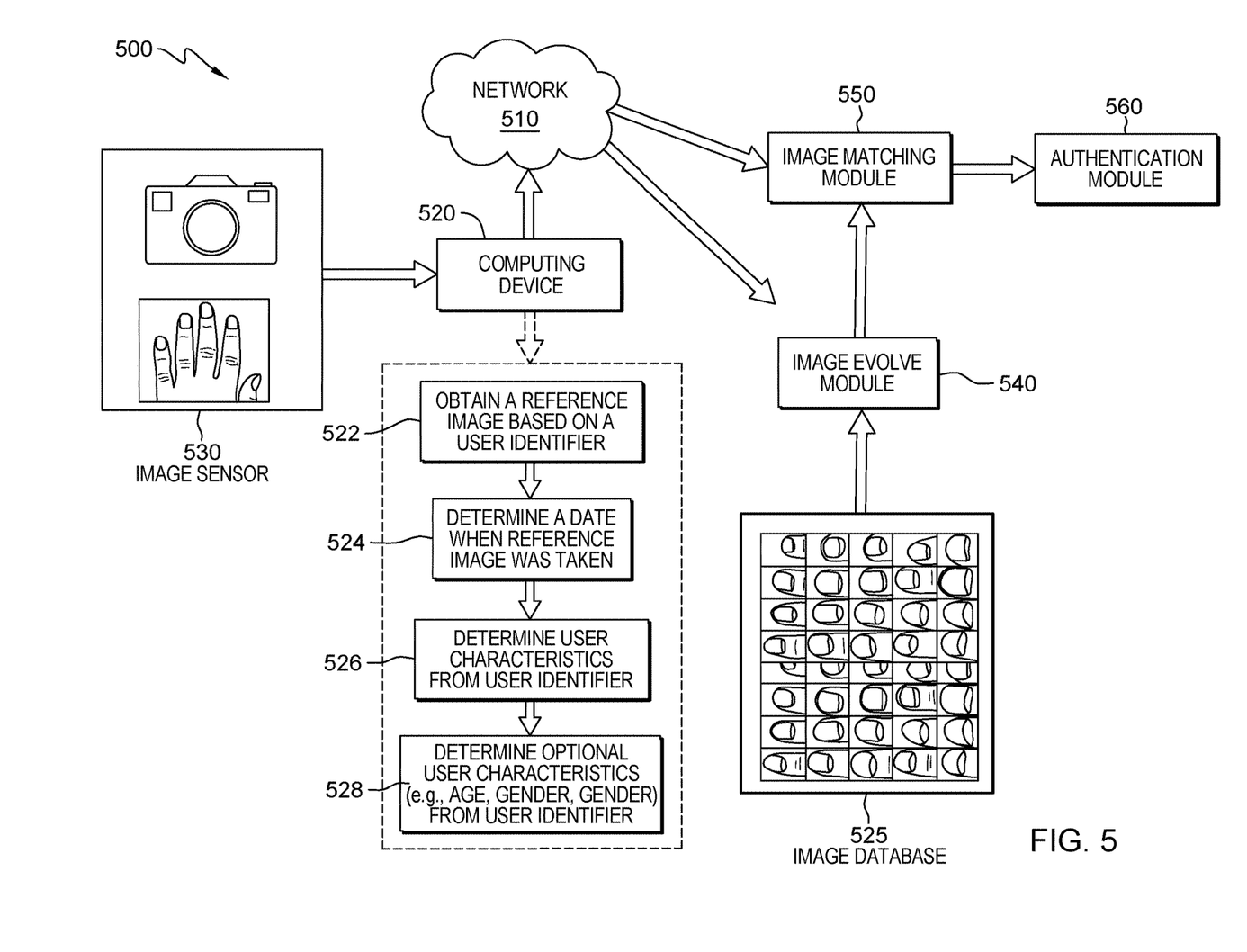
FIG. 5 depicts a block diagram of a distributed network environment for authenticating a user, in accordance with an embodiment of the present invention.

FIG. 5 depicts a distributed networking environment 500 for authenticating a user, in accordance with an embodiment of the present invention. FIG. 5 provides only an illustration of one embodiment of the present invention and does not imply any limitations with regard to the environments in which different embodiments may be implemented. Distributed networking environment 500 represents a system for biometric based security with natural expiration of biometric data corresponding to a user. In the depicted embodiment, distributed networking environment 500 includes network 510 to facilitate communication between computing device 520 and other components existing within distributed networking environment 500.

Computing device 520 may include one or more processors configured to process and analyze data received at computing device 520. For example, computing device 520 may include one or more processors configured to obtain 522 a reference image based on a user identifier corresponding to a user. Computing device 520 may also be configured to determine 524 when a reference image was taken. Further, computing device 520 may be configured to determine 526 user characteristics from the user identifier. Even further, computing device 520 may be configured to determine 528 optional user characteristics (e.g., age, gender) from the user identifier. Processes performed or executed on computing device 520 may be performed or executed by one or more processors residing elsewhere in distributed network environment 500. For example, a server (not shown) may be in communication with network 510 and may be configured to perform or execute any of the processes that computing device 520 may be configured to perform or execute.

Distributed networking environment 500 may also include image database 525 configured to store, receive and transmit image data to other components via network 510. The image data may correspond to images of fingers of a user, and more specifically fingernail images of a user. Image database 525 may also include data corresponding to the image data including biometric data representative of features and characteristics of the subject of the images. For example, image database 525 may include images of a finger of a hand of a user, where each image may include corresponding finger characteristic data or finger feature data to distinguish one finger image from another.

Image sensor 530 (e.g., camera) may be communicatively coupled to computing device 520 and configured to capture images within view of one or more lenses of image sensor 530. Image sensor 530 may be configured to capture images using infrared (IR) light, near IR light or any other type of image detection technology known to a person of ordinary skill in the art.

Distributed networking environment 500 may also include one or more modules configured to perform specific processing tasks. For example, image evolve module 540 may be configured for evolving or progressing image data corresponding to a first finger image to a second finger image representative of the first finger image at a time later than the time the first finger image was taken or captured. In other words, if the reference image is a first finger image that includes a first date at which the first finger image was taken, then image evolve module 540 may be configured to modify first finger image data to generate second finger image data corresponding to a point in time that is later than the first date. Second finger image data may be generated based on first finger image data, a time-varying characteristic and a change rate, as described above herein.

In another embodiment, image evolve module 540 may also be configured to modify first finger image data to generate second finger image data corresponding to a representative point in time that is prior to the first date. In other words, image evolve module 540 may be configured to perform a backwards evolution on finger image data to generate finger image data corresponding to how the finger characteristics were previous in time.

Distributed networking environment 500 may further include image matching module 550 which may be configured for determining if a match exists between two or more images. For example, image matching module 550 may be configured to receive at least one image from computing device 520, either via network 510 or directly from computing device 520, receive at least one other image from image evolve module 540 and determine if a match exists between at least two of the images. Image matching module 550 may be configured to determine if a match exists by performing an analysis on biometric features or biometric characteristics identified in the respective image data. For example, first biometric data may include data corresponding to first fingernail features and second biometric data may include data corresponding to second fingernail features, wherein second biometric data may be generated, using image evolve module 540, based at least on first biometric data, a time-varying characteristic of first fingernail features and a change rate.

Image matching module 550 may be configured to receive third biometric data from computing device 520 at a time later than the first time and determine if third biometric data is within a predetermined threshold of second biometric data at the later time. Image matching module 550 may be configured to determine that a match exists between second biometric data and third biometric data if the difference between the data is within a predetermined threshold.

Image matching module 550 may also be configured to determine if biometric data includes a date corresponding to when image data was captured is beyond a time period. If the date corresponding to image data exceeds a predetermined threshold, image matching module may be configured to label that image data as expired and refuse to consider it during a matching request. In other words, image matching module 550 may be configured to expire or render obsolete image data that is beyond a time period threshold (e.g., 100 days).

Distributed networking environment 500 may further include authentication module 560 which may be configured to authenticate a user if a match exists between data corresponding to a captured image and data corresponding to an image generated by image evolve module 540 within a predetermined threshold. The user may be authenticated if biographical data corresponding to the user is determined, by image matching module 550, to be valid and a satisfactory match is determined to exist between the subject finger image data.

After a successful authentication, the most recent captured biometric data may be stored to image database 525 to update image database 525 with the new images that correspond to a high confidence score due to their recency. For example, the first biometric data may be stored in the database and be associated with the time at which the finger image was taken. The second biometric data may also be stored in database(s) 525 and also be associated with the time at which the finger image was taken, but only if user 140 was authenticated with the second biometric data. If the second biometric data is determined to be within a predetermined threshold of the first biometric data, then database(s) 525 may be updated with the second biometric data to increase the confidence score corresponding to the most recent images stored in database(s) 525. If user 140 is not authenticated with the second biometric data, the second biometric data may be discarded or saved in the database as a set of images associated with a low confidence score.

Figure 6:
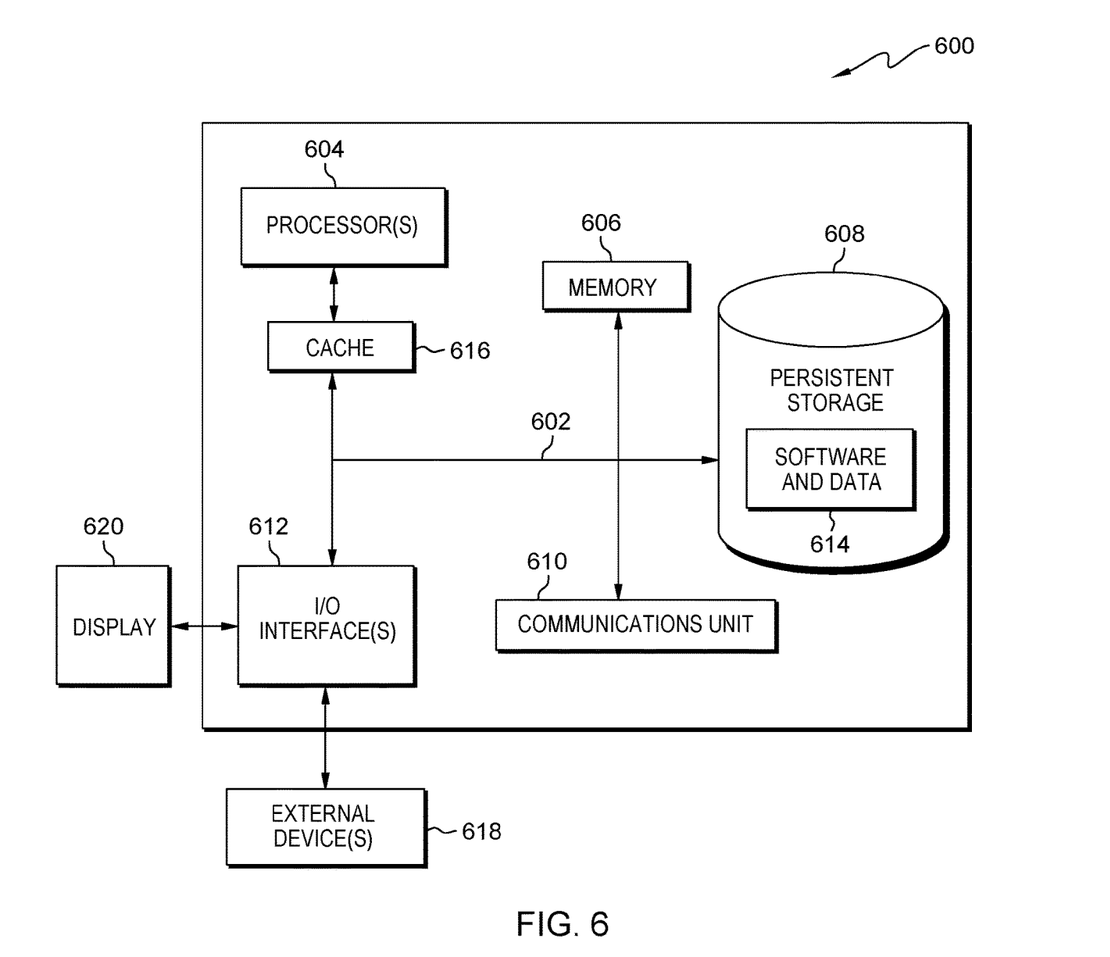
FIG. 6 depicts a block diagram of a computing device of distributed network environment, in accordance with an embodiment of the present invention.

FIG. 6 depicts a block diagram of a computing device of distributed computing environment, in accordance with an embodiment of the present invention. FIG. 6 depicts a block diagram of computing device 600 suitable for server(s) 125 and computing device 120, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs, as described herein, may be downloaded to persistent storage 608 through communications unit 610.

I/O interface(s) 612 allows for input and output of data with other devices that may be connected to computing device 120. For example, I/O interface 612 may provide a connection to external devices 618 such as image sensor 130, a keyboard, a keypad, a touch screen, and/or some other suitable input device. External devices 618 can also include portable computer readable storage media such as, for example, thumb drives, portable optical or magnetic disks, and memory cards. Software and data 614 used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Predictive model or predictive algorithm described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for authenticating a user, the computer-implemented method comprising:
    receiving, by one or more processors, first biometric data comprising a time-varying characteristic at a first time, wherein the first biometric data is associated with a user;
    receiving, by the one or more processors, second biometric data comprising the time-varying characteristic at a second time that is later in time than the first time, wherein the second biometric data is associated with the user;
    determining, by the one or more processors, third biometric data based at least on the first biometric data, the second time, and the time-varying characteristic; and
    authenticating, by the one or more processors, the user if the third biometric data is within a predetermined threshold of the second biometric data.

2. The computer-implemented method of claim 1, wherein determining the third biometric data is further based on biographical data corresponding to the user, wherein the biographical data comprises data corresponding to at least one of age, gender, health history, nutrition, location, hormones, or habits of the user.

3. The computer-implemented method of claim 1, wherein the first biometric data comprises finger image data corresponding to at least one digit of a hand of the user.

4. The computer-implemented method of claim 3, further comprising:
    determining a first length of a first fingernail of the at least one digit of the hand of the user based on the finger image data, wherein the time-varying characteristic comprises the first length of the first fingernail.

5. The computer-implemented method of claim 1, wherein the third biometric data is determined at least in part by applying a change rate to the time-varying characteristic of the first biometric data at the second time.

6. The computer-implemented method of claim 1, further comprising:
    storing the first biometric data in a database at the first time;
    storing the second biometric data in the database associated with the second time if the user is authenticated; and
    updating the database with the second biometric data to increase a confidence score corresponding to recent images in the database.

7. The computer-implemented method of claim 1, wherein the time-varying characteristic comprise fingernail characteristics corresponding to nail plate features and nail markings.

8. A computer program product for authenticating a user, the computer program product comprising:
    one or more computer readable storage media and program instructions stored on the one or more computer readable storage media, the program instructions comprising:
        program instructions to receive, by one or more processors, first biometric data comprising a time-varying characteristic at a first time, wherein the first biometric data is associated with a user;
        program instructions to receive, by the one or more processors, second biometric data comprising the time-varying characteristic at a second time that is later in time than the first time, wherein the second biometric data is associated with the user;

program instructions to determine, by the one or more processors, third biometric data based at least on the first biometric data, the second time, and the time-varying characteristic; and program instructions to authenticate, by the one or more processors, the user if the third biometric data is within a predetermined threshold of the second biometric data.

9. The computer program product of claim 8, wherein determining the third biometric data is further based on biographical data corresponding to the user, wherein the biographical data comprises data corresponding to at least one of age, gender, health history, nutrition, location, hormones, or habits of the user.

10. The computer program product of claim 8, wherein the first biometric data comprises finger image data corresponding to at least one digit of a hand of the user.

11. The computer program product of claim 10, further comprising:

determining, by the one or more processors, a first length of a first fingernail of the at least one digit of the hand of the user based on the finger image data, wherein the time-varying characteristic comprises the first length of the first fingernail.

12. The computer program product of claim 8, wherein the third biometric data is determined at least in part by applying a change rate to the time-varying characteristic of the first biometric data at the second time.

13. The computer program product of claim 10, further comprising:

program instructions to store the first biometric data in a database at the first time;

program instructions to store the second biometric data in the database associated with the second time if the user is authenticated; and program instructions to update the database with the second biometric data to increase a confidence score corresponding to recent images in the database.

14. The computer program product of claim 8, wherein the time-varying characteristic comprise fingernail characteristics corresponding to nail plate features and nail markings.

15. A computer system for authenticating a user, the computer system comprising:

one or more computer processors;

one or more computer readable storage media;

program instructions stored on the one or more computer readable storage media for execution by at least one of the one or more processors, the program instructions comprising:

program instructions to receive, by one or more processors, first biometric data comprising a time-varying characteristic at a first time, wherein the first biometric data is associated with a user;

program instructions to receive, by the one or more processors, second biometric data comprising the time-varying characteristic at a second time that is later in time than the first time, wherein the second biometric data is associated with the user;

program instructions to determine, by the one or more processors, third biometric data based at least on the first biometric data, the second time, and the time-varying characteristic; and program instructions to authenticate, by the one or more processors, the user if the third biometric data is within a predetermined threshold of the second biometric data.

16. The computer system of claim 15, wherein determining the third biometric data is further based on biographical data corresponding to the user, wherein the biographical data comprises data corresponding to at least one of age, gender, health history, nutrition, location, hormones, or habits of the user.

17. The computer system of claim 15, wherein the first biometric data comprises finger image data corresponding to at least one digit of a hand of the user.

18. The computer system of claim 17, further comprising:

determining a first length of a first fingernail of the at least one digit of the hand of the user based on the finger image data, wherein the time-varying characteristic comprises the first length of the first fingernail.

19. The computer system of claim 15, wherein the third biometric data is determined at least in part by applying a change rate to the time-varying characteristic of the first biometric data at the second time.

20. The computer system of claim 15, wherein the time-varying characteristic comprise fingernail characteristics corresponding to nail plate features and nail markings.

* * * * *